United States Patent
Wilmot et al.

[11] 3,720,942
[45] March 13, 1973

[54] VIDEO PROCESSING SYSTEM

[75] Inventors: Richard D. Wilmot, Yorba Linda; Oscar G. Bradshaw, Garden Grove; David G. Wiggins, Fullerton, all of Calif.

[73] Assignee: Hughes Aircraft Company, Culver City, Calif.

[22] Filed: March 4, 1971

[21] Appl. No.: 120,952

[52] U.S. Cl. .................................. 343/7.7, 343/7 A
[51] Int. Cl. ............................................... G01s 9/42
[58] Field of Search ................. 343/7.7, 7 A, 5 DR

[56] References Cited

UNITED STATES PATENTS

| | | | |
|---|---|---|---|
| 3,419,862 | 12/1968 | Harrison et al. | 343/7.7 |
| 3,080,557 | 3/1963 | Davis et al. | 343/7.7 |
| 3,576,564 | 4/1971 | Galvin | 343/7.7 |
| 3,505,637 | 4/1970 | Abruzzo | 343/7 A |
| 3,582,872 | 6/1971 | Prager | 343/7 A |
| 3,626,412 | 12/1971 | Buckley | 343/7.7 |
| 3,587,097 | 6/1971 | Stull, Jr. | 343/7.7 |

Primary Examiner—Benjamin A. Borchelt
Assistant Examiner—G. E. Montone
Attorney—W. H. MacAllister, Jr. and George Jameson

[57] ABSTRACT

A system for automatically processing quantized normal and MTI radar video to provide improved clutter rejection and improved detection of moving targets in clutter. The quantized MTI video is applied to a mean level detector, which has its sensitivity controlled as a function of the number of detected target reports being stored in an output buffer unit in order to automatically provide the proper threshold to prevent a data link from being saturated by clutter targets. The quantized MTI video output of the mean level detector and the quantized normal video are applied to a video selector circuit, which is controlled by a clutter pattern sensor for each range bin interval of a radar sweep to automatically select for subsequent detection and processing the MTI video in all range bin intervals having clutter and the normal video in all range bin intervals not having clutter.

21 Claims, 8 Drawing Figures

Richard D. Wilmot,
Oscar G. Bradshaw,
David G. Wiggins,
INVENTORS,

BY.

George Jameson
ATTORNEY.

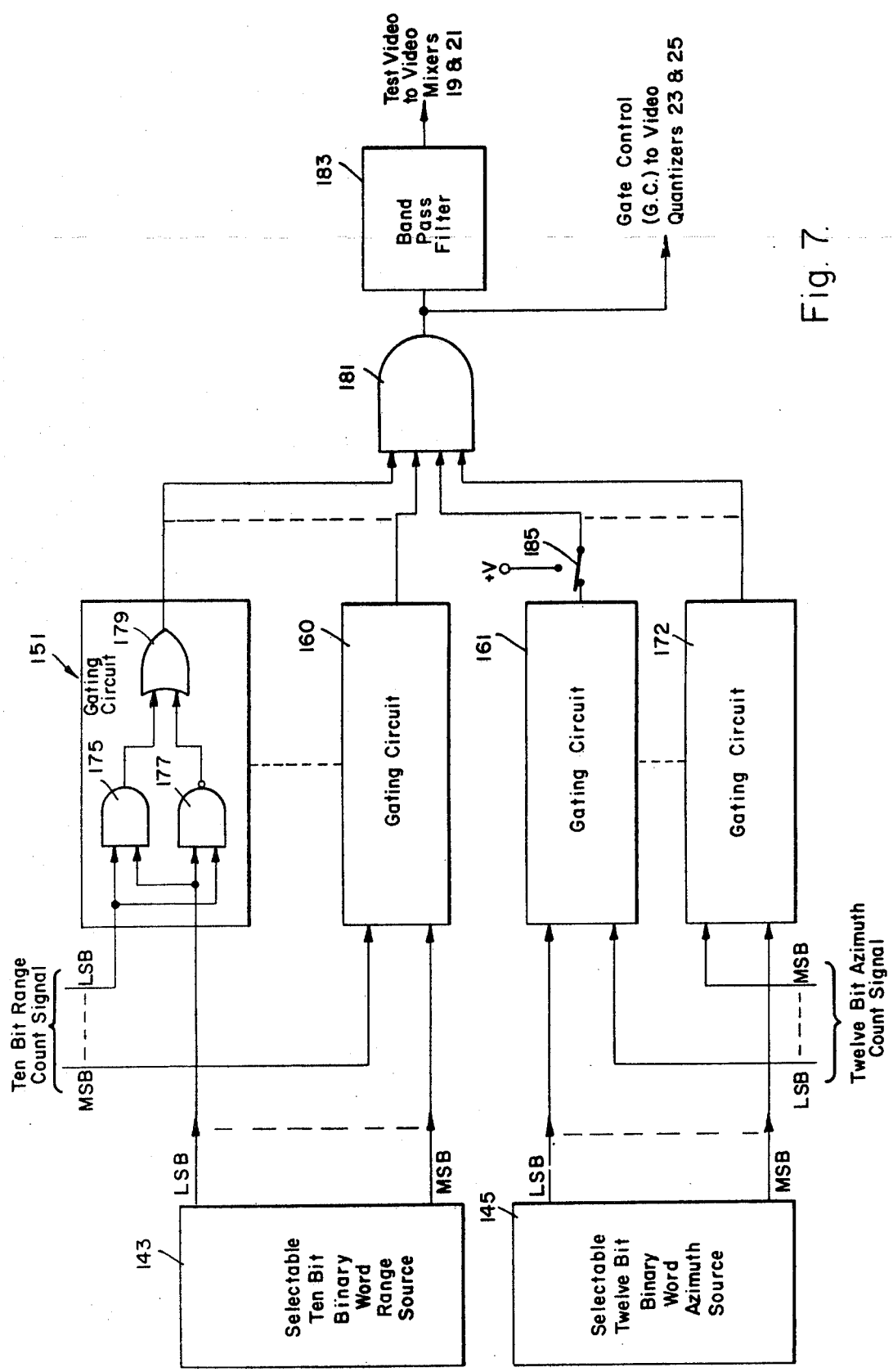

VIDEO PROCESSING SYSTEM

BACKGROUND OF THE INVENTION

1. Field of the Invention

This invention relates to radar processing systems and particularly to an automatic system for processing quantized normal and MTI radar video to provide improved clutter rejection and improved detection of moving targets in clutter.

2. Description of the Prior Art

A major problem in automatic detection, acquisition and digital track-while-scan systems is the automatic processing of all the video returns from the surveillance radar. Generally, to detect targets, the radar video from each range bin interval is quantized or digitized and recorded as a hit when exceeding a selected threshold level, also known as a skim level. When the number of hits from a given number of sweeps exceeds a selected value, a target is assumed to be present in the particular range bin interval. Unfortunately, such signals are produced by invalid targets as well as valid targets. For example, ground clutter, sea clutter, weather returns, radar interference and radar jamming can produce sufficient hits in a particular range bin interval to be mistaken for valid targets.

In one type of radar processing system, all hit reports are stored in a computer memory and processed in accordance with a computer program so as to attempt to distinguish between valid and invalid targets, i.e., detect the presence of invalid targets, hereafter generally referred to as clutter. In a second type of radar processing system a running count of the hits from a given area in space is made and when the count becomes too high, automatic track acquisition is inhibited from such an area. Both of these methods of automatic target tracking require expensive and complex equipment. The first system requires a very large memory in order to store the large number of hits from valid as well as invalid targets and a complex computer program to distinguish between the targets. The second system requires a large memory to store all the hits in both range and azimuth in order to determine the hit density of any given area. In addition, this second system requires the use of highly complex count-up and count-down logic circuitry. Also, detection of clutter in such systems is a function of the presence of clutter over a larger area, so the detection of small isolated clutter patterns is impossible.

A third type of radar processing system utilizes range gating to gate MTI (moving target indication) video received out to that range at which clutter no longer occurs and then to use normal video in the clear or non-clutter areas. However, this method of target detection has substantial disadvantages since it does not identify the presence of clutter. Clear areas and clutter areas can occur anywhere over the entire range area. Cloud formations, radar beam ducting, etc., can produce clutter returns which obscure valid targets beyond the range within which the MTI is used. On the other hand, clear areas can occur within the area in which the video is processed by the MTI range gating. Since the use of MTI degrades the target detection sensitivity of the radar receiver within the range in which the MTI processing is utilized, valid targets occurring in clear areas within the MTI range are degraded along with the clutter.

A fourth type of radar processing system automatically recognizes clutter on the basis of certain predetermined digitized video hit return patterns. Typically, hits produced by a valid target are limited to one or two range bin intervals, and to one antenna beam width in azimuth. This clutter-recognition system detects when this pattern assumed to be characteristic of a valid target does not exist and therefore causes the rejection of the hits as not being received from a valid target. This system has been found to be effective in detecting evenly diffused clutter in solid areas, but has been found to be relatively ineffective in detecting broken up clutter.

A fifth type of radar processing system relates to a clutter-recognition system which is capable of automatically detecting the presence of broken up clutter, using such information to inhibit the radar system from regarding hits received from such an area as indicative of the presence of a valid target in the area. A major disadvantage of the fourth and fifth types of radar processing systems is that when clutter is sensed in an area, all returns from that area, whether from a valid target or from clutter, are rejected. Also, these systems can erroneously identify a strong target as clutter, since the stronger that a target is, the more hits will be returned from that target.

SUMMARY OF THE INVENTION

Briefly, Applicants have provided a system for processing radar video to provide improved clutter rejection and improved detection of moving targets in an area having clutter conditions. The sensitivity of a mean level detector, to which MTI video is applied, is controlled as a function of the number of target reports being stored, and a video selector circuit is controlled by a clutter pattern sensor to utilized MTI video in each range bin interval area in which clutter is sensed and to utilize normal video in all clear range bin interval areas.

It is therefore an object of this invention to provide a video processing system having an improved clutter rejection capability.

Another object of this invention is to provide a video processing system having an automatic fault detection and isolation capability.

Another object of this invention is to provide an improved system for the detection of moving targets in clutter.

Another object of this invention is to provide a system for automatically controlling the threshold sensitivity level of MTI video in clutter areas as a function of the number of detected target reports being stored in an output buffer in order to prevent the buffer from being saturated by an excessive number of target reports.

A further object of this invention is to provide a system for automatically selecting MTI video to be processed in each range bin interval area in which clutter is detected and normal video to be processed in all clear range bin interval areas.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein:

FIG. 7 is a schematic block diagram of the test target generator 17 of FIG. 1.

DESCRIPTION OF THE PREFERRED EMBODIMENT

Figure 1:
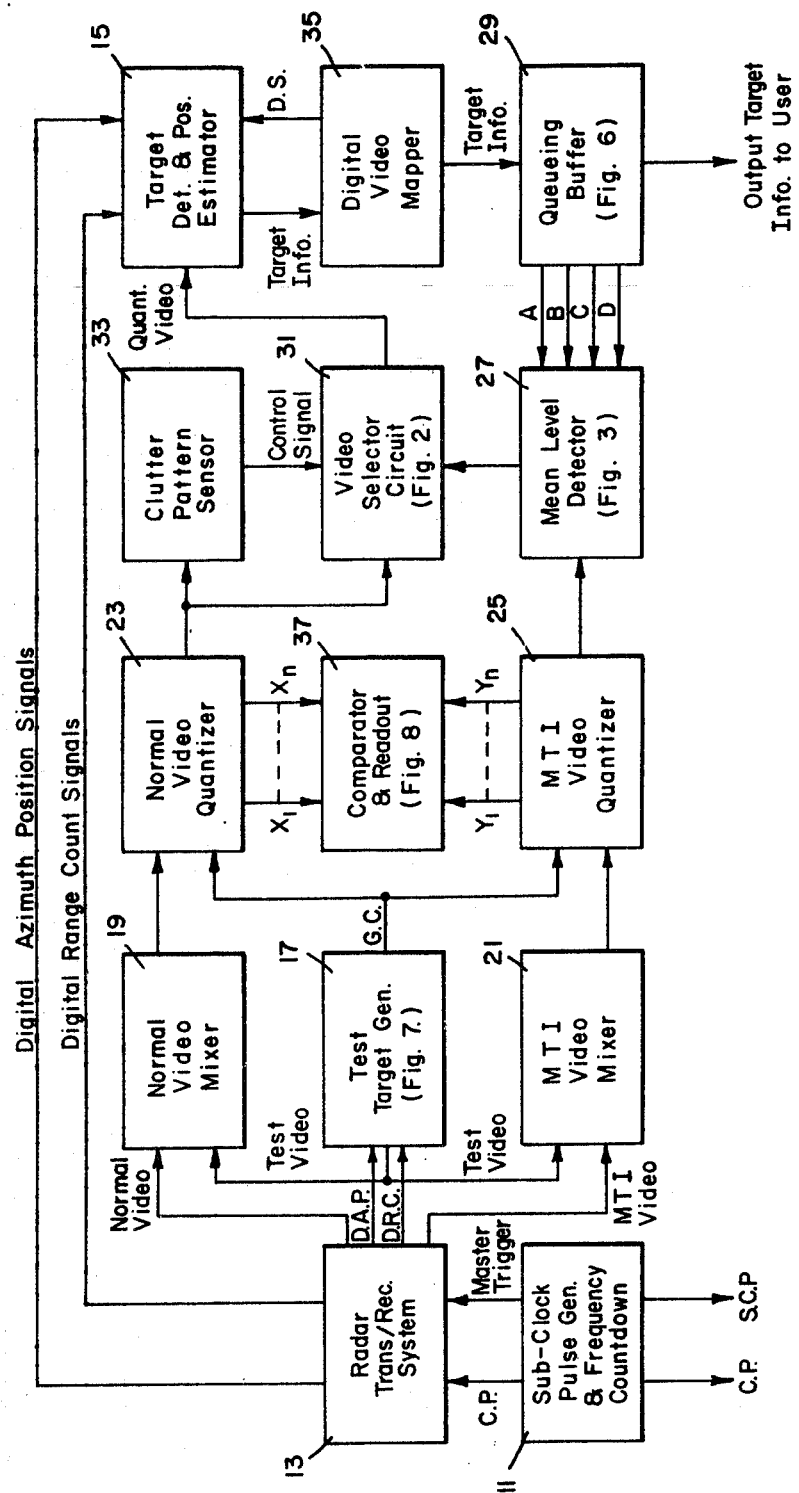
FIG. 1 is a schematic block diagram of a preferred embodiment of this invention when used for processing radar video returns.

Referring now to the drawings, FIG. 1 illustrates a preferred embodiment of this invention when used for processing radar video returns. A sub-clock pulse generator and frequency count-down circuit 11 generates basic sub-clock pulses (S.C.P.) which are counted-down by, for example, an eight-to-one frequency count-down circuit (not shown) to develop clock pulses (C.P.), which in turn are counted-down to develop a master trigger signal which may have a pulse repetition frequency of several hundred pulses per second. The master triggers are applied to a radar transmitter-receiver system 13 which, in response thereto and to the energy subsequently received from each range bin interval in space, develops normal and MTI video signals. The normal and MTI video signals may be respectively developed by any suitable or conventional normal and MTI receivers (not shown) within the system 13 and have amplitudes which respectively vary as a function of the received signal energy in a conventional search mode of operation. The radar transmitter-receiver system 13 also receives clock pulses from the circuit 11 to enable the system 13 to generate digital range count and azimuth position signals which are applied to any suitable or conventional target detector and position estimator 15, which indicates signal strength as part of the detection process, such as that shown and described in U.S. Pat. No. 3,406,390. The system 13 also applies the digital azimuth position signals (D.A.P.) and digital range count signals (D.R.C.) to a test target generator 17 to enable the generator 17 to generate and apply test video to video mixers 19 and 21 during, for example, a desired range bin interval within the radar dead time of a radar sweep and at any desired azimuth position or positions.

A range counter (not shown), which for example may be a Mod 1024 counter defining 1000 radar range intervals (range bins) of live time in space from which reflected energy may be received by the system 13 and 24 radar range intervals of dead time for testing purposes, is contained within the radar transmitter-receiver system 13. At each live time range bin interval, which corresponds to the radar pulse width, normal and MTI video signals are respectively applied to normal and MTI video mixers 19 and 21. The test video, which is also applied to the mixers 19 and 21, does not interact with the normal and MTI video signals since the test video is applied during the radar dead time while the normal and MTI video signals are applied during the radar live time. For descriptive purposes just the normal and MTI video signals appearing at the respective outputs of the mixers 19 and 21 during the radar live time will first be considered.

The normal and MTI video signals are respectively sampled at the clock pulse (C.P.) rate by normal and MTI video quantizers 23 and 25, each of which quantizes or digitizes the associated video signals occurring during each range bin interval into, for example, sixteen amplitude levels to provide a four bit digital code, whose numerical value or amplitude represents the relative value of the peak of each video return during each range bin interval with respect to a preselected amplitude quantizing threshold level.

The four bit quantized MTI video signals from the quantizer 25 are applied to a mean level detector 27, which has its sensitivity controlled by an A, B, C, or D signal from a queueing buffer 29 as an inverse function of the number of detected target reports being stored in the buffer 29. With a minimum number of targets stored in the buffer 29, the buffer 29 develops the A signal which allows the mean level detector 27 to operate at its maximum sensitivity to allow a maximum number of quantized MTI video signals to pass therethrough to a video selector circuit 31. The buffer 29 develops the D signal to decrease the threshold sensitivity of the mean level detector 27 to the input quantized MTI signals to its lowest level when a maximum number of targets are being stored in the buffer 29 to prevent subsequent equipment from being saturated by clutter targets. The remaining B and C signals respectively cause the detector 27 to develop intermediate threshold sensitivity levels.

The four bit quantized normal video signals from the quantizer 23 are applied to the video selector circuit 31 and to a clutter pattern sensor 33. The clutter pattern sensor 33 may be any suitable or conventional system similar to that shown and described in U.S. Pat. No. 3,353,177, in which for each range bin interval the history of pervious hit patterns in the particular range bin interval as well as in adjacent range bin intervals is available to determine whether or not the present hit in the particular range bin interval is due to clutter or a valid target.

Upon detecting the presence of clutter in a range bin interval, the clutter pattern sensor 33 automatically generates a binary 1 state control signal for that range bin interval. When no clutter is detected in a range bin interval, the clutter pattern sensor 33 automatically generates a binary 0 state control signal for that range bin interval. The video selector is enabled by the binary 1 state control signal from the sensor 33 to pass MTI video from the mean level detector 27 to the target detector 15, and is enabled by the binary 0 state control signal from the sensor 33 to pass normal video from the normal video quantizer 23 to the target detector 15. As a result, the video selector circuit 31 is controlled by the clutter pattern sensor 33 to apply to the target detector 15 quantized MTI video for all range bin intervals having clutter and quantized normal video for all range bin intervals in which clutter was not sensed.

The quantized video output of the video selector circuit 31 and the digital azimuth position and range count signals from the radar transmitter-receiver system 13 are applied to the target detector and position estimator 15, which applies as target information, for example, a 28 bit word for each target detected to a digial video mapper 35. Each 28 bit word may be comprised of: a ten bit range count signal from the previously mentioned Mod 1024 counter (not shown) contained within the radar transmitter-receiver system 13; a 12 bit azimuth count signal from a Mod 4096 counter (not shown) fed by azimuth change signals generated by a read amplifier (not shown)-and-digitizer combination having 4096 magnetic spots positioned at equal intervals around the circumference of a search antenna assembly (not shown) contained within the system 13; an active bit (a binary 1 state signal) generated by the target detector 15 to indicate that a target has been detected; four bits to indicate the strength of the detected target; and a bit to indicate in which one of the quantizers 23 and 25 the target was detected, to thereby determine whether or not the target was detected in a clutter area. It should be understood, however, that if more information were desired, the bit capacity of each word could be increased accordingly.

The digital video mapper 35 may be any suitable and conventional video mapping device, such as that shown and described in U.S. Pat. No. 3,325,806. The digital video mapper 35 controls the detection sensitivity of the target detector 15 by applying a detection sensitivity signal (D.S.) thereto. The target information from the digital video mapper 35 is applied to the queueing buffer 29. The queueing buffer 29 stores and formats the input target information for subsequent application of output target information to a user, which may be a data link or a tracking computer. As specified before, the buffer 29 also utilizes the stored target information to control, as an inverse function of the number of targets stored, the sensitivity of the mean level detector 27 in clutter areas where most false alarms occur. This control is necessary in order to prevent the saturation of the data link or tracking computer by supplying thereto more data than can be handled.

As previously described, the test target generator 17 is enabled to generate test video for testing purposes at preselected range and azimuth positions during the radar dead time by the D.A.P. and D.R.C. signals. Also at this time a gate control signal (G.C.) is generated and applied to the video quantizers 23 and 25 to enable gates (not shown) in the quantizers 23 and 25 to pass digital signals $X_1 \ldots X_N$ from the quantizer 23 and digital signals $Y_1 \ldots Y_N$ from the quantizer 25 to be compared under test conditions by a comparison and readout circuit 37. The digital signals $X_1 \ldots X_N$ and $Y_1 \ldots Y_N$ are from respectively corresponding circuits in the quantizers 23 and 25. The comparison and readout circuit 37 compares corresponding signals from corresponding circuits of the quantizers 23 and 25 and, in the event of a malfunction in one of circuits of one of the quantizers 23 and 25, lights a lamp to indicate the defective circuit. For example, if the digital signals $X_5$ and $Y_5$ are not identical, a lamp will be lit to indicate that the fifth circuit (not shown) in one of the quantizers 23 and 25 is defective. On the other hand, if the digital signals $X_5$ and $Y_5$ are identical, no lamp will be lit, thereby indicating that no trouble exists in either of the fifth circuits of the quantizers 23 and 25. While this automatic fault detection and isolation technique is only illustrated for the video quantizers 23 and 25, it could also be used with the video mixers 19 and 21 by coupling therebetween another comparison and readout circuit like the circuit 37. The technique could be used in any partial or complete dual channel configuration. The remaining circuits of FIG. 1 respond to the quantized normal and MTI test video outputs from the quantizers 23 and 25, respectively, in the same manner previously discussed. The test video at the preselected range and azimuth may be monitored with an oscilloscope at the output of the queueing buffer 29. The system of FIG. 1 will now be explained in more detail by referring to other FIGURES.

Figure 2:
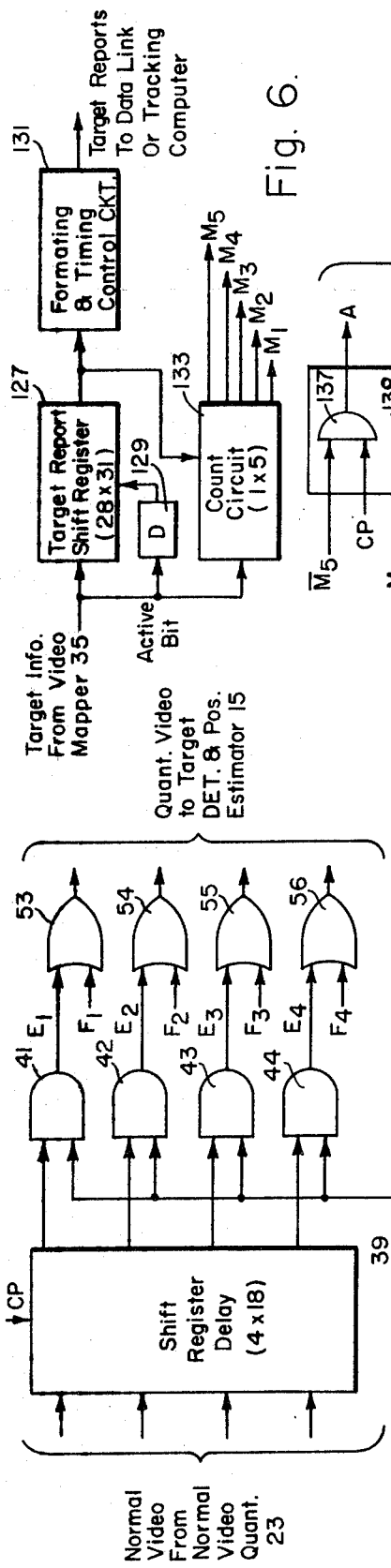
FIG. 2 is a schematic block diagram of the video selector circuit 31 of FIG. 1.

FIG. 2 illustrates a schematic block diagram of the video selector circuit 31 of FIG. 1. The video selector circuit 31 comprises a shift register delay line and groups of AND and OR gates which are switched by the binary state of the control signal from the clutter pattern sensor 33 of FIG. 1 to selectively pass during each range bin interval either the normal video from the video quantizer 23 or the MTI video from the mean level detector 27. More specifically, the four-bit quantized normal video from the video quantizer 23 is serially clocked at the clock pulse rate through a shift register delay line 39 to the upper inputs of AND gates 41 through 44, while the four-bit quantized MTI video from the mean level detector 27 is directly applied to the upper inputs of AND gates 46 through 49. The shift register delay line 39 comprises four shift registers (not shown) to accommodate the four-bit quantized normal video. Each of the four shift registers in the digital delay line 39 may be comprised of 18 sequentially coupled conventional flip-flops. The delay line 39 is therefore designated as (4 × 18) to show that it is four bits wide and 18 bits long. The sequence of four-bit normal video words is delayed by the digital delay line 39 for eighteen clock pulse periods, or range bin intervals, to compensate for an internal delay incurred by the quantized MTI video in passing through the mean level detector 27. The control signal from the clutter pattern sensor 33 is directly applied to the lower inputs of the AND gates 46 through 49, and is further inverted by a NAND gate 51 and applied to the lower inputs of the AND gates 41 through 44. The outputs of the AND gates 41 through 44 are respectively represented by $E_1$ through $E_4$, while the outputs of the AND gates 46 through 49 are respectively represented by $F_1$ through $F_4$. The outputs from the groups $E_1$ through $E_4$ and $F_1$ through $F_4$ are each respectively applied to OR gates 53 through 56.

In operation, when the clutter pattern sensor 33 senses clutter during a range bin interval, binary 1 state control signal is generated for that range interval. This 1 state control signal enables the AND gates 46 through 49 to pass the MTI video from the mean level detector 27 through the OR gates 53 through 56 to the target detector and position estimate 15. This 1 state control signal from the sensor 33 is also inverted by the NAND gate 51 to thereby disable the AND gates 41 through 44.

When the clutter pattern sensor 33 does not sense clutter during a range bin interval it generates a 0 state control signal which disables the AND gates 46 through 49. This 0 state control signal is also inverted by the NAND gate 51 to enable the AND gates 41 through 44 to pass the normal video from the video quantizer 23 through the OR gates 53 through 56 to the target detector and position estimator 15. As a result, the video selector circuit 31 is controlled by the control signal from the clutter pattern sensor 33 to pass to the target detector 15, for subsequent processing and detection, MTI video during each range bin interval that clutter is sensed and normal video during each range bin interval that no clutter is sensed.

Figure 3:
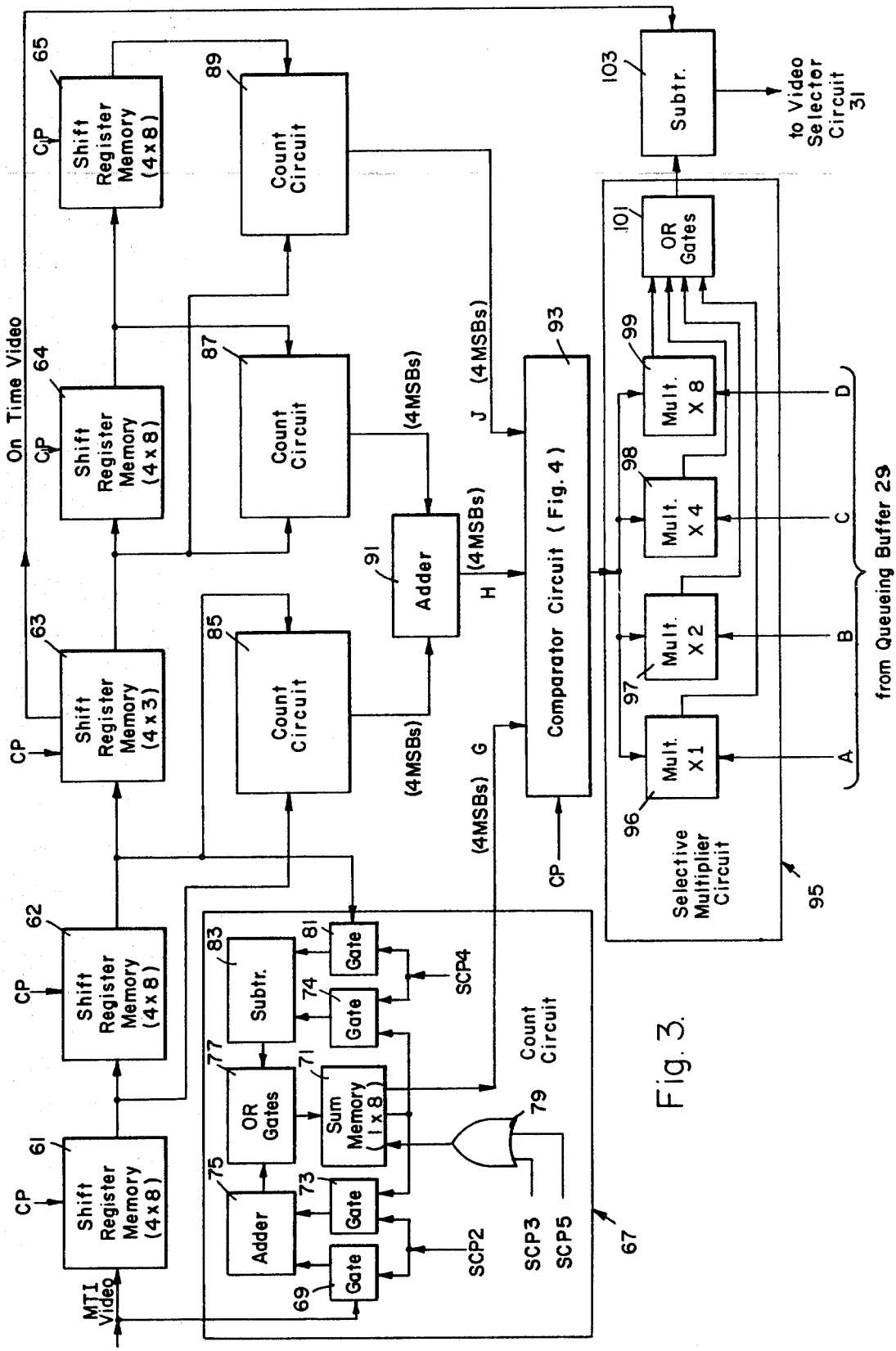
FIG. 3 is a schematic block diagram of the mean level detector 27 of FIG. 1.
Figure 4:
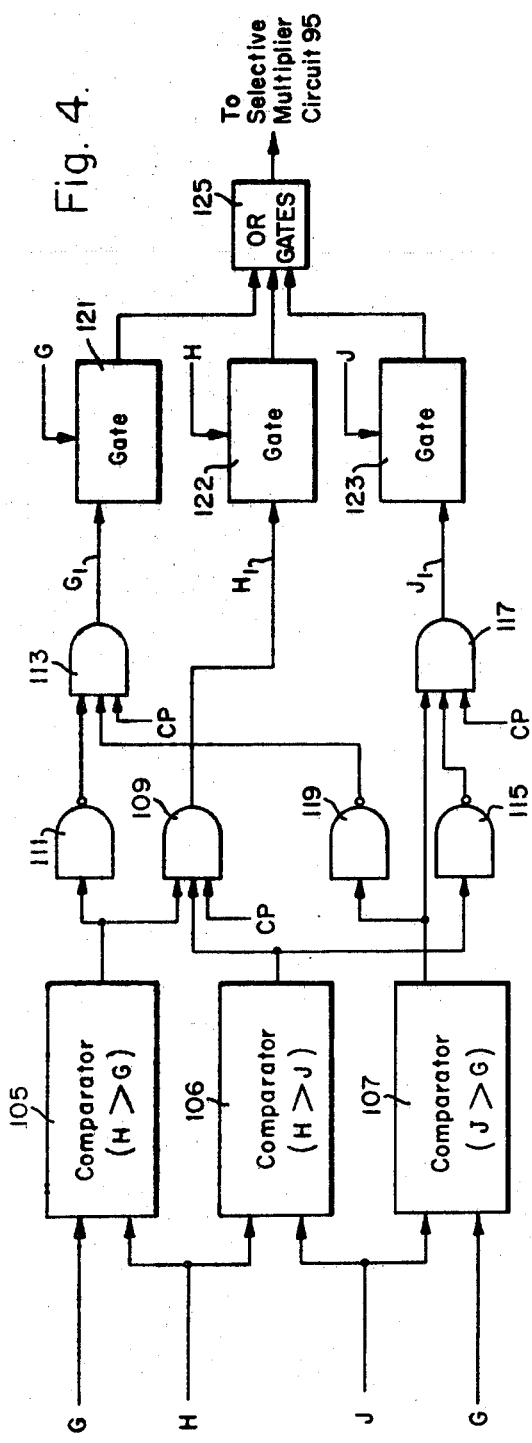
FIG. 4 is a schematic block diagram of the comparator circuit 93 of FIG. 3.
Figure 5:
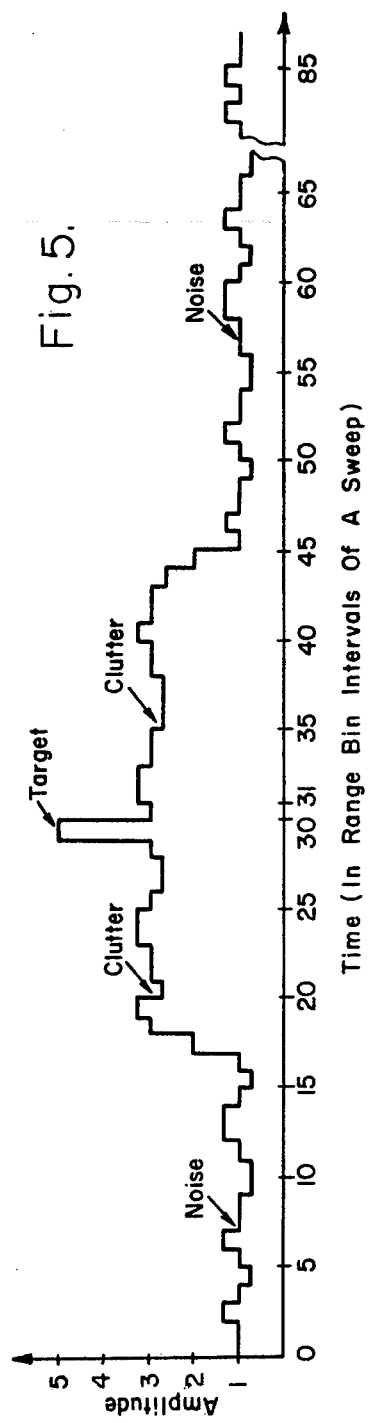
FIG. 5 illustrates a graph useful in explaining the operation of the mean level detector 27 of FIGS. 1 and 3.

Referring now to FIGS. 3, 4 and 5, the mean level detector 27 of FIG. 1 will now be more fully explained. Basically, the mean level detector 27 automatically adapts to whichever one of three background clutter areas (each encompassing sixteen range bin intervals) that has the highest average clutter level during each range bin interval that on-time MTI video is being sampled, and uses that highest average clutter level to cancel the clutter contained in the on-time video being sampled to prevent that clutter from being passed to the video selector switch 31. As a result, all noise and clutter in the on-time video being sampled, other than random noise and clutter which is greater than the average value selected, is eliminated and only a target in the on-time video having an amplitude above the strongest average background clutter level will be applied to the video selector switch 31, thereby greatly improving the signal-to-clutter ratio of the MTI video.

The operation of the mean level detector 27 will now be discussed to show how the above-identified function of the detector 27 is accomplished. The sequence of four-bit MTI video words from the MTI video quantizer 25 are serially clocked at the clock pulse rate through serially coupled shift register memories 61 through 65. Each of the shift register memories 61 through 65 comprises four shift registers (not shown) to accommodate the four-bit quantized MTI video. Each of the four shift registers in each of the shift register memories 61 through 65 may be comprised of, for example, sequentially coupled conventional flip-flops (not shown) equal in number to the bit length of the associated shift registers. The shift register memories 61, 62, 64 and 65 are each eight bits in length and designated as (4 × 8), with the shift register memory 63 being of three bits in length and designated as (4 × 3), with each bit of length ocorresponding to a range bin interval.

The MTI video words being applied to the input of the shift register memory 61 from the MTI video quantizer 25 are also applied to a count circuit 67, which is also coupled to the output of the shift register memory 62 to receive therefrom the MTI video words being serially clocked through the memories 61 and 62. The purpose of the count circuit 67 is to sequentially develop the average or mean value of the target and/or clutter levels of the 16 MTI video words being stored in the shift register memories 61 and 62 for each range bin interval in the radar live time. To accomplish this purpose the count circuit 67 operates in the following manner. Each of the four bit MTI video words, appearing at the input of the shift register memory 61, is applied to a gate 69 at the same time that the output of a sum memory 71 is applied to gates 73 and 74. The sum memory 71 may be comprised of eight parallel-fed conventional flip-flops (not shown), and is designated as (1 × 8) to show that it has the capability of storing an eight-bit word (a maximum count of 255). It should be recalled that it was previously specified that the basic sub-clock pulses (S.C.P.) were counted down eight-to-one to produce the clock pulses (C.P.). As a result, there are eight sub-clock pulses (SCP1 through SCP8) for each clock pulse. After the inputs to the gates 69 and 73 have stabilized, the SCP2 pulse is applied to the gates 69 and 73 to enable them to respectively pass the four-bit MTI video word at the input of the memory 61 and the eight-bit output of the sum memory 71 to a full adder 75 having an eight-bit capacity. The digital sum from the adder 75, is applied through a set of (eight) OR gates 77, arranged similar to the OR gates of FIG. 2, to the input of the sum memory 71. The SCP3 pulse is applied through an OR gate 79 to the sum memory 71 to enable the digital sum at the input of the sum memory 71 to be parallel stored therein and to be applied to the gates 73 and 74. The four-bit MTI word at the output of the shift register 62, which had been applied to the input of the shift register 61 sixteen clock pulse intervals previously, is applied to gate 81. After the inputs to the gates 81 and 74 have stabilized, the SCP4 pulse is applied to the gates 81 and 74 to enable them to respectively pass the four-bit MTI video word at the output of the memory 62 and the eight-bit output of the sum memory 71 to a subtractor 83 having an eight-bit capacity. The digital difference from the subtractor 83 is applied through the set of OR gates 77 to the input of the sum memory 71. The SCP5 pulse is applied through the OR gate 79 to the sum memory 71 to enable the digital difference at the input of the sum memory 71 to be parallel stored therein and to be applied to the gates 73 and 74. The above operation of the count circuit 63 is repeated during each range bin interval to enable the count circuit 67 to store in its sum memory 71 the total digital sum of the 16 four-bit MTI words contained in the shift register memories 61 and 62 during each corresponding range bin interval. The four most significant bits (4 MSBs) (a divide by sixteen operation) of the total digital sum at the output of the sum memory 71 provide the average or mean value G of the 16 four-bit MTI words stored in the shift register memories 61 and 62 during each range bin interval. The average value G could also have been derived by the use of a divide-by-sixteen circuit at the output of the sum memory 71.

Count circuits 85 and 87 are also utilized to provide an average or mean value H, while a count circuit 89 is used to provide an average or mean value J. The count circuits 85, 87 and 89 are similar to the count circuit 67. During each range bin interval the count circuits 85 and 87 respectively add to their respective stored counts the four-bit MTI word inputs to the shift register memories 62 and 64, and respectively subtract from their respective stored counts the four-bit MTI word outputs from the shift register memories 62 and 64. In this manner the count circuits 85 and 87 store in their respective sum memories (not shown but similar to that of the sum memory 71) the respective total digital sums of the eight four-bit MTI words contained in the respective shift register memories 62 and 64 during each corresponding range bin interval. The four most significant bits (4 MSBs) of each of the total digital sums of the counts circuits 85 and 87 are added together in an adder 91 to provide the average or mean value H of the 16 four-bit MTI words stored in the shift register memories 62 and 64 during each range bin interval.

In a like manner, during each range bin interval, the count circuit 89 adds to its stored count the four-bit MTI word input to the shift register memory 64 and subtracts from its stored count the four-bit MTI word output from the shift register memory 65. By this operation the count circuit 89 stores in its sum memory (not shown but similar to that of the sum memory 71) the total digital sum of the 16 four-bit MTI words contained in the shift register memories 64 and 65 during each corresponding range bin interval. The four most significant its (4 MSBs) of the total digital sum at the output of the count circuit 89, which as before is a left shift four places or divide-by-sixteen operation, provide the average or mean value J of the sixteen four-bit MTI words stored in the shift register memories 64 and 65 during each range bin interval.

The average or mean values G, H, and J are applied to a comparator circuit 93 which, at the clock pulse time during each range bin interval, selects and applies the largest mean value of G, H and J to a selective multiplier circuit 95. The selective multiplier circuit 95 may consist of the multipliers 96 through 99, which have their respective outputs coupled to a set of (four) OR gates 101, arranged similar to the OR gates of FIG. 2. For illustrative purposes the multipliers 96 through 99 are shown as respectively having multiplier values of one (X1), two (X2), four (X4) and eight (X8). However, it should be understood that different multiplier values could be selected. The aforementioned largest mean value of G, H and J is applied from the comparator circuit 93 as the common multiplicand for the multipliers 96 through 99. The multipliers 96 through 99 are selectively enabled by the A, B, C AND D signals from the queueing buffer 29, with only one of the A, B, C and D signals occurring during any given clock pulse time or range bin interval. As a result, during each range bin interval the largest mean value from the comparator circuit 93 is multiplied by either one, two, four or eight, depending upon which one of the A, B, C and D signals that is being applied from the buffer 29.

The multiplied largest mean value of G, H and J is applied through the set of OR gates 101 to a subtractor 103. The four-bit MTI video or on-time video from the output of the second flip-flop group (not shown) in the shift register memory 63 is also applied to the subtractor 103 during each range bin interval. The multiplied largest means value of G, H and J is subtracted from the on-time video from the memory 63, with the resultant difference being applied to the video selector circuit 31. The subtractor 103 is mechanized to not develop negative numbers. Therefore, whenever the multiplied largest mean value of G, H and J equals or exceeds the amplitude of the four-bit on-time MTI video from the memory 63, the output of the subtractor 103 is zero.

FIG. 4 illustrates a schematic block diagram of the comparator circuit 93 of FIG. 3. The mean value G from the count circuit 67 is applied to comparators 105 and 107; the mean value H from the adder 91 is applied to comparators 105 and 106; and the mean value J from the count circuit 89 is applied to the comparators 106 and 107. Each of the comparators 105, 106 and 107 is a conventional comparator, such as a four-bit comparator DM7200/DM8200, manufactured by the National Semiconductor Corporation of Santa Clara, California. Each of the comparators 105, 106 and 107 operates to develop either a binary 1 state or a binary 0 state output, with the comparator 105 developing a binary 1 state output when H exceeds G, (H > G), the comparator 106 developing a binary 1 state output when H exceeds J (H > J), and the comparator 107 developing a binary 1 state output when J exceeds G (J > G).

The output of the comparator 105 is applied to an input of AND gate 109 and is also inverted by a NAND gate 111 and applied to an input of an AND gate 113, while the output of the comparator 106 is applied to a second input of the AND gate 109 and is also inverted by a NAND gate 115 and applied to an input of an AND gate 117. In addition, the output of the comparator 107 is applied to a second input of the AND gate 117 and is also inverted by a NAND gate 119 and applied to a second input of the AND gate 113. The clock pulse (CP) is applied to a third input of each of the AND gates 113, 109, and 117. The outputs of the AND gates 113, 109 and 117 are respectively applied as enabling signals $G_1$, $H_1$, and $J_1$ to selectively enable gates 121 through 123, respectively, at each clock pulse time to pass one of the G, H and J mean values through a set of (four) OR gates 125, similar to the OR gates of FIG. 2, to the selective multiplier circuit 95 (FIG. 3). Various operational conditions will now be discussed in regard to the operation of the comparator circuit 93 of FIG. 4.

When G is the largest mean value, the binary 0 state outputs of the comparators 105 and 107 disable the AND gates 109 and 117, to prevent the gates 122 and 123, respectively, from passing either of the mean value inputs H and J to the OR gates 125. At the same time, the binary 0 state outputs of the comparators 105 and 107 are respectively inverted by the NAND gates 111 and 119 to cause the AND gate 113 to develop the $G_1$ signal at the clock pulse time to enable the gate 121 to pass the G mean value through the OR gates 125 to the selective multiplier circuit 95.

When H is the largest mean value, the binary 1 output of the comparator 106 is inverted by the NAND gate 115 to disable the AND gate 117 to prevent the gate 123 from passing the mean value input J to the OR gates 125, while the inversion of the binary 1 state output of the comparator 105 by the NAND gate 111 disables the AND gate 113 to prevent the gate 121 from passing the mean value input G to the OR gates 125. At the same time, the binary 1 state outputs of the comparators 105 and 106 cause the AND gate 109 to develop the $H_1$ signal at the clock pulse time to enable the gate 122 to pass the H mean value through the OR gates 125 to the selective multiplier circuit 95.

When J is the largest means value, the binary 0 output of the comparator 106 disables the AND gate 109 to prevent the gate 122 from passing the mean value input H to the OR gates 125, while the inversion of the binary 1 state output of the comparator 107 by the NAND gate 119 disables the AND gate 113 to prevent the gate 121 from passing the mean value input G to the OR gates 125. At the same time, the binary 1 state output of the comparator 107 and the inversion of the binary 0 state output of the comparator 106 by the NAND gate 115 cause the AND gate 117 to develop the $J_1$ signal at the clock pulse time to enable the gate 123 to pass the J mean value through the OR gates 125 to the selective multiplier circuit 95.

By the same reasoning, if the mean values G, H and J are all equal, then all of the comparators 105 through 107 develop binary 0 state outputs which disable the AND gates 109 and 117 and enable the AND gate 113 to pass the G mean value through the OR gates 125. In a like manner, it can be readily ascertained by those skilled in the art that: if G is equal to H and both are greater than J, the G mean value will be passed through the gate 121; if G is equal to J and both are greater than H, the G mean value will be passed through the gate 121; and if H = J and both are greater than G, the J mean value will be passed through the gate 123 and OR gates 125 to the selective multiplier circuit 95 at the clock pulse time.

Reference is now made to FIG. 5 to further illustrate the selectable operation of the mean level detector 27 of FIG. 3. A graph of typical quantized MTI video (before target detection) over 85 range bin intervals of a radar sweep is illustrated in FIG. 5. Noise having an average amplitude of approximately one is shown occurring during the range bin intervals 1 – 17 and 46 – 85, clutter having an average amplitude of approximately three is shown occurring during the range bin intervals 18 – 45, and a target having an approximate amplitude of five is shown occurring during the thirtieth range bin interval. These referenced 85 range bin intervals are shifted serially at the clock pulse rate through the shift register memories 61 through 65, with the quantized MTI video in the first range bin interval entering the shift register memory 61 first and that from the eighty-fifth range bin interval entering the memory 61 84 clock pulse intervals later.

When the four bit MTI video in the range bin interval 18, which is shown having an approximate amplitude of two, in FIG. 5, is being sampled at the output of the second flip-flop group (not shown) in the shift register memory 63 as the on-time video, the video in the range bin intervals 1 – 8, 9 – 16, 17 – 19, 20 – 27, and 28 – 35 are respectively contained in the shift register memories 65, 64, 63, 62 and 61. As a consequence the mean values G, H, and J will be approximately equal to three, two and one, respectively. The mean value G, which is now equal to three, is selected by the comparator circuit 93 to be applied to the selective multiplier circuit 95. Assume that the queueing buffer 29 is storing a minimum number of targets, and therefore generates an A signal to enable the X1 multiplier 96. The resultant product of three is then subtracted in the subtractor 103 from the on-time video in the range bin interval 18, which has an amplitude of two. It should be recalled that it was specified that the subtractor 103 was mechanized to develop a difference of zero, rather than a negative number, whenever the selected multiplied mean value (G, H or J) was greater in amplitude than that of the on-time video from the memory 63.

Therefore the output of the subtractor 103 will be equal to zero when the on-time video is the MTI video in the range bin interval 18.

When the target in the range bin interval 30, which is shown having an approximate amplitude of five, is being sampled as the on-time video, the video in the range bin intervals 13 – 20, 21 – 28, 29 – 31, 32 – 39, and 40 – 47 are respectively contained in the shift register memories 65, 64, 63, 62 and 61. Therefore, the mean values G, H and J will be approximately equal to 2+, 3 and 2+, respectively, with the mean value H, which is now equal to three, being selected by the comparator circuit 93 for application to the selective multiplier circuit 95. Assume that an A signal is applied from the buffer 29 to enable the X1 multiplier 96. The resultant product of three is then subtracted in the subtractor 103 from the on-time video in the range bin interval 30, which has an amplitude of five. Thus, the output of the subtractor will be equal to two when the target in the range bin interval 30 is being sampled as the on-time video.

Now let it be assumed at this time in the preceding example that the queueing buffer 29 is storing more than a minimum number of targets, and therefore generates a B signal to desensitize the mean level detector 27. This B signal enables the X2 multiplier 97 to apply a resultant product of six to the subtractor 103 to be subtracted from the target amplitude of five. Since, it will be recalled, the subtractor 103 was mechanized to not develop a negative number, the output of the subtractor will be equal to zero for any target not having an amplitude over six when the largest mean value is three and a B signal is generated by the buffer 29. On the other hand, if a moving target is larger in amplitude than eight times the largest clutter mean, it will still be detected and tracked, even though a D signal is being generated by the buffer 29.

It should be readily ascertainable by those skilled in the art, in view of the previous discussion, that when the range bin intervals 31, 45 and 65 are sampled at the on-time video position of the second flip-flop group of the shift register 63, the subtractor 103 will supply to the video selector circuit 31 the approximate MTI video levels of 0, 0, and 0, respectively. Thus, all noise and clutter in the on-time video being sampled, other than random noise and clutter greater than the average value selected, is eliminated and only a target in the on-time video having an amplitude above the multiplied largest average background clutter level will be applied to the video selector circuit 31, thereby greatly improving the signal-to-clutter ratio of the MTI video.

Figure 6:
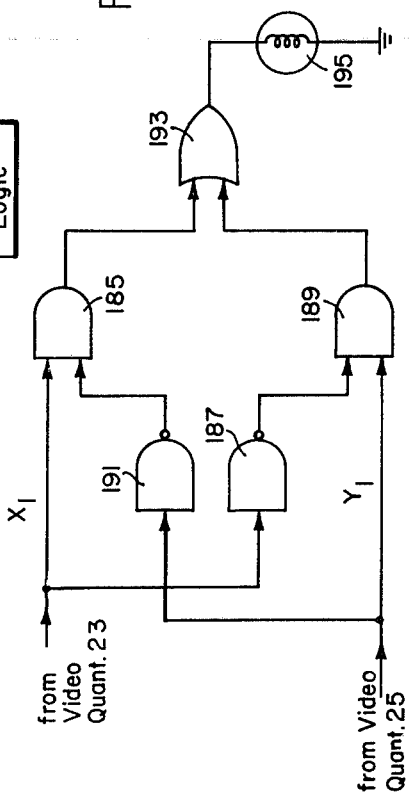
FIG. 6 is a schematic block diagram of the queueing buffer 29 of FIG. 1.

Attention is now directed to FIG. 6, which is a schematic block diagram of the queueing buffer 29 of FIG. 1. Target report information, consisting of a sequence of twenty-eight-bit words from the video mapper 35, is applied to a target reports shift register 127, similar to the shift registers 61 through 65 but shifted by slightly delayed active bits rather than by clock pulses. As specified previously, an active bit is a 1 state binary bit that is generated by the target detector and position estimator 15 of FIG. 1 each time that a target is detected. The shift register 127 is 28 bits wide to accommodate the ten-bit range information, the 12-bit azimuth count information, the active bit, the four-bit target strength information, and the bit to indicate whether or not the target was detected in a clutter area. The shift register 127 may be 31 bits in length and is therefore designated as (28 × 31).

The active bit from the input target report information is applied through a delay circuit (D) 129 to enable the shift register 127 to store the input target information therein. The output target report information from the shift register 127 is applied to a formation and timing control circuit 131 which places each of the 28-bit words from the register 127 in any desired format, e.g., parallel to serial format, before applying the output target report information to a data link or a tracking computer.

The active bit from the input target report information to the register 127 is also applied to a count circuit 133, similar to the count circuit 67 in FIG. 3. The count circuit 133 has a sum memory (not shown), which may be comprised of five parallel-fed conventional flip-flops (not shown), and is designated as (1 × 5) to show that it has the capability of storing a five-bit word (a maximum target count of 31). The active bit from the output target report information from the register 127 is also applied to the count circuit 133. Each input active bit applied to the register 127 is added to the stored count in the count circuit 133, while each output active bit applied to the formation and timing control circuit 131 is subtracted from the stored count in the count circuit 133. Thus, the count circuit 133 keeps a running count of the number of the detected target reports being stored in the register 127. The outputs of the five flip-flops in the sum memory (not shown) of the count circuit 133 are respectively designated as $M_1$ through $M_5$, with $M_1$ being the least significant bit, $M_2$ being the second least significant bit, ... and $M_5$ representing the most significant bit. These five flip-flop outputs have a maximum of 32 different states or active bit counts, as shown in Table I below.

TABLE I

| Output Signal of Circuit 135 | Flip-Flop States | | | | | Active Bit Count |
|---|---|---|---|---|---|---|
| | $M_5$ | $M_4$ | $M_3$ | $M_2$ | $M_1$ | |
| | 0 | 0 | 0 | 0 | 0 | 0 |
| | 0 | 0 | 0 | 0 | 1 | 1 |
| | 0 | 0 | 0 | 1 | 0 | 2 |
| 0 | 0 | 0 | 0 | 1 | 1 | 3 |
| | 0 | 0 | 1 | 0 | 0 | 4 |
| | 0 | 0 | 1 | 0 | 1 | 5 |
| | 0 | 0 | 1 | 1 | 0 | 6 |
| | 0 | 0 | 1 | 1 | 1 | 7 |
| A | 0 | 1 | 0 | 0 | 0 | 8 |
| | 0 | 1 | 0 | 0 | 1 | 9 |
| | 0 | 1 | 0 | 1 | 0 | 10 |
| | 0 | 1 | 0 | 1 | 1 | 11 |
| | 0 | 1 | 1 | 0 | 0 | 12 |
| | 0 | 1 | 1 | 0 | 1 | 13 |
| | 0 | 1 | 1 | 1 | 0 | 14 |
| | 0 | 1 | 1 | 1 | 1 | 15 |
| | 1 | 0 | 0 | 0 | 0 | 16 |
| | 1 | 0 | 0 | 0 | 1 | 17 |
| | 1 | 0 | 0 | 1 | 0 | 18 |
| | 1 | 0 | 0 | 1 | 1 | 19 |
| B | 1 | 0 | 1 | 0 | 0 | 20 |
| | 1 | 0 | 1 | 0 | 1 | 21 |
| | 1 | 0 | 1 | 1 | 0 | 22 |
| | 1 | 0 | 1 | 1 | 1 | 23 |
| | 1 | 1 | 0 | 0 | 0 | 24 |
| | 1 | 1 | 0 | 0 | 1 | 25 |
| C | 1 | 1 | 0 | 1 | 0 | 26 |
| | 1 | 1 | 0 | 1 | 1 | 27 |
| | 1 | 1 | 1 | 0 | 0 | 28 |
| | 1 | 1 | 1 | 0 | 1 | 29 |
| D | 1 | 1 | 1 | 1 | 0 | 30 |
| | 1 | 1 | 1 | 1 | 1 | 31 |

To develop the output A, B, C and D signals, a multiplier select logic circuit 135 is comprises of AND gates 137 through 140. The AND gate 137 is enabled by $\overline{M}_5$ (the complement of $M_5$) and CP (the clock pulse) to develop the A signal for counts from 0 through 15. The AND gate 138 is enabled by $M_5$, $\overline{M}_4$ (the complement of $M_4$) and CP to develop the B signal for counts from 16 through 23. The AND gate 139 is enabled by $M_5$, $M_4$, $\overline{M}_3$ (the complement of $M_3$) and CP to develop the C signal for counts from 24 through 27. The AND gate 140 is enabled by $M_5$, $M_4$, $M_3$ and CP to develop the D signal for counts from 28 through 31. The selective development of the signals A, B, C and D for their respective count ranges can be readily seen by again referring to Table I. It should also be obvious that the multiplier select logic circuit 135 could have been mechanized to obtain different count ranges for the A, B, C and D signals, depending upon the desired system requirements.

Referring now to FIG. 7, there is illustrated a schematic block diagram of the test target generator 17 of FIG. 1. It should be recalled that the test target generator 17 generates test video for testing the operation of various circuits (not shown) in the video quantizers 23 and 25 during a desired range and azimuth position. A selectable 10-bit binary word range source 143 generates a 10-bit word for the desired range, while a selectable 12-bit binary word azimuth source 145 generates a 12-bit word for the desired azimuth. Each of the sources 143 and 145 may be a set of switches, a set of flip-flops, or any suitable source of a multibit binary word. The ten bits from the range source 143 and the corresponding ten bits in the range count signal are each respectively applied to gating circuits 151 through 160, while the twelve bits from the azimuth source 145 and the corresponding 12 bits from the azimuth count signal are each respectively applied to gating circuits 161 through 172. Each of the gating circuits 151 through 172 acts as a coincidence gate to generate an output binary 1 state signal when there is coincidence between its corresponding inputs, e.g., the second least significant bit from the range source 143 and the second least significant bit from the 10-bit range count.

The gating circuit 151, which is representative of the remaining gating circuits 152 through 172, discloses the mechanization for detecting coincidence between corresponding inputs. More specifically, the least significant bit (LSB) from the 10-bit range count and the LSB from the range source 143 are applied to the input terminals of an AND gate 175 and a NAND gate 177. The output of the AND gate 175 and the output of the NAND gate 177 are coupled to the input of an OR gate 179, which in turn develops the output of the gating circuit 151. When both LSBs are in a binary 1 state, the AND gate 175 causes a binary 1 state to be developed at the output of the OR gate 179. In a like manner, when both LSBs are in a binary 0 state, the NAND gate 177 causes a binary 1 state to be developed at the output of the OR gate 179.

In operation, whenever there is coincidence between the two corresponding inputs of each of the gating circuits 151 through 172 (a range and azimuth compare), the gating circuits 151 through 172 all develop binary 1 state outputs to enable an AND gate 181 to apply a binary 1 state signal to a bandpass filter 183. The bandpass filter 183 rounds and shapes the digital pulse to make it resemble a video pulse before applying the resultant test video pulse to the video mixers 19 and 21. The binary 1 state signal from the AND gate 181 is also applied as a gate control signal (G.C.) to the video quantizers 23 and 25 to enable them to respectively apply the corresponding digital signals $X_1 \ldots X_N$ and $Y_1 \ldots Y_N$ therefrom to the comparison and readout circuit 37. It should be mentioned at this point that, if it is desired to develop a test video pulse to simulate two pulses in azimuth in one antenna beamwidth, the gating circuit 161 should be eliminated or, in lieu of the output of the gating circuit 161, a 1 state signal +V should be applied through a switch 185 to the AND gate 181 so as to not affect the AND gate 181, thereby effectively dropping off the least significant azimuth bit. If it is desired to generate four (or eight) pulses in azimuth, then the gating circuits 161 and 162 (or the gating circuits 161 through 163) should be eliminated in a manner similar to that discussed in relation to the circuit 161 only in order to simulate target returns from adjacent azimuth positions for the same range bin interval.

Figure 8:
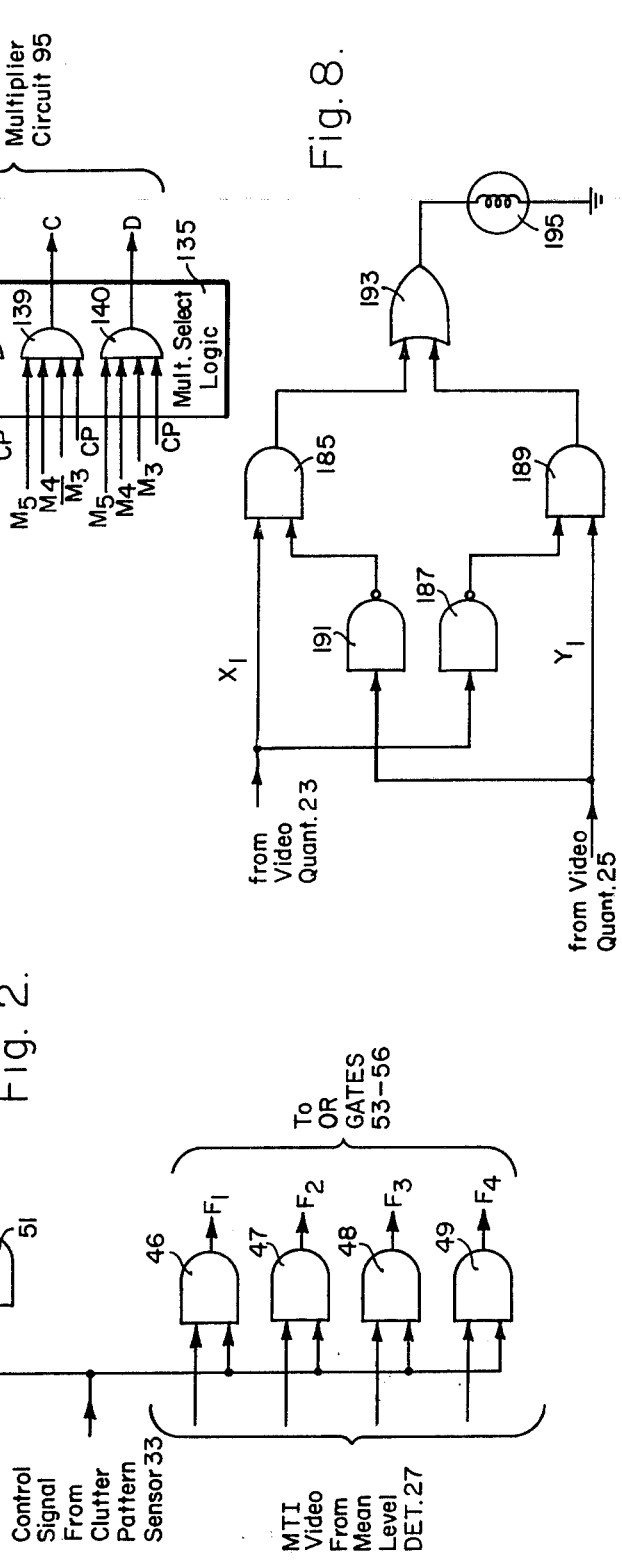
FIG. 8 is a schematic block diagram of one portion of the comparison and readout circuit 37 of FIG. 1.

With the generation and application of the $X_1 \ldots X_N$ and $Y_1 \ldots Y_N$ digital signals to the comparison and readout circuit 37, comparisons are made of the digital signals in each corresponding pair. FIG. 8 discloses a schematic block diagram of one of N similar portions of the comparison and readout circuit 37 of FIG. 1. The $X_1$ digital signal from the normal video quantizer 23 is directly applied to an AND gate 185, and is also inverted by a NAND gate 187 before being applied to an AND gate 189. The $Y_1$ digital signal from the MTI video quantizer 25 is directly applied to the AND gate 189, and is also inverted by a NAND gate 191 before being applied to the AND gate 185. The outputs of the AND gates 185 and 189 are applied to an OR gate 193, which in turn has its output coupled through an indicator lamp 195 to ground.

When the $X_1$ and $Y_1$ signals are both in a binary 1 state, the inversion of the 1 state $X_1$ signal by the NAND gate 187 disables the AND gate 189 and the inversion of the 1 state $Y_1$ signal by the NAND gate 191 disables the AND gate 185, thereby preventing any current flow from the OR gate through the lamp 195. When the $X_1$ and $Y_1$ signals are both in a binary 0 state, the 0 state $X_1$ signal disables the AND gate 185 and the 0 state $Y_1$ signal disables the AND gate 189 to prevent the lamp 195 from being lit. However, when the $X_1$ and $Y_1$ signals are respectively in binary 1 and 0 states, the 1 state $X_1$ signal and the inversion of the 0 state $Y_1$ signal by the NAND gate 191 enable the AND gate 185 to pass a 1 state signal through the OR gate 193 to light the lamp 195 to indicate a defect in either the $X_1$ or $Y_1$ circuit. In a like manner, when the $X_1$ and $Y_1$ signals are respectively in binary 0 and 1 states, the 1 state $Y_1$ signal and the inversion of the 0 state $X_1$ signal by the NAND gate 187 enable the AND gate 189 to pass a 1 state signal through the OR gate 193 to light the lamp 195 to indicate a defect in either the $X_1$ or $Y_1$ circuit. The remaining portions of the comparison and readout circuit 37 are identical to that shown in FIG. 8 and basically operate in the same manner to automatically perform fault detection and isolation.

The invention thus provides a system for automatically processing quantized normal and MTI radar video to provide improved clutter rejection and improved detection of moving targets in clutter, prevention of output buffer saturation, and automatic fault detection and isolation.

While the salient features have been illustrated and described, it should be readily apparent to those skilled in the art that modifications can be made within the spirit and scope of the invention as set forth in the appended claims.

What is claimed is:

1. A system for selectively processing sequences of multibit quantized normal and MTI video in a plurality of range bin intervals over a plurality of range sweeps to provide clutter rejection and detection of moving targets in clutter comprising:

first means for selecting during each range bin interval one of a plurality of average values of clutter levels as a function of the quantized MTI video applied thereto;

circuit means coupled to said first means for providing output threshold-controlled quantized MTI video in which clutter is selectively rejected as a function of the selected value of clutter level during each range bin interval;

second means responsive to the quantized normal video for providing a first control signal during each range bin interval, said first control signal being in a first state during each range bin interval in which a clutter signal is sensed and in a second state during each range bin interval in which no clutter signal is sensed;

third means coupled between said circuit means and said second means and being adapted to receive the quantized normal video, said third means automatically selecting the threshold-controlled quantized MTI video in any range bin interval in which the first control signal is in a first state and the quantized normal video in any range bin interval in which the first control signal is in a second state;

fourth means coupled to said third means being responsive to video selected by said third means for detecting targets and developing target information during the plurality of range bin intervals; and fifth means coupled to said circuit means and to said fourth means being responsive to the target information from said fourth means for generating a second control signal during each range bin interval to control the threshold sensitivity of said circuit means as a function of the number of targets being detected by said fourth means.

2. The system of claim 1 wherein said third means includes:

delay means responsive to the quantized normal video for providing a delayed quantized normal video;

first gating means coupled to said fourth means for passing video thereto to be detected;

second gating means coupled to said second means and said first gating means and adapted to receive the threshold-controlled quantized MTI video; and third gating means coupled to said second means and said first gating means and adapted to receive the quantized normal video from said delay means, said second gating means being enabled to pass the threshold-controlled quantized MTI video to said first gating means when the first control signal is in the first state, said third gating means being enabled to pass the quantized normal video to said first gating means when the first control signal is in the second state.

3. The system of claim 1 wherein said fifth means includes:
target memory means coupled to said fourth means for storing target information;
second count circuit means coupled to said target memory means for counting the number of targets being stored in said target memory means; and
fourth gating means coupled to said second count circuit means and said circuit means for generating the second control signal to control the threshold sensitivity of said circuit means as a function of the number of targets being stored in said target memory means.

4. The system of claim 3 wherein said fifth means further includes:
sixth means coupled to said target memory means for converting the target information being stored in said target memory means into a preselected format for subsequent use.

5. The system of claim 1 wherein said fourth means includes:
a target detector and position estimator unit, coupled between said third and fifth means, being responsive to the quantized video from said third means for generating the target information utilized by said fifth means.

6. The system of claim 5 wherein said fourth means further includes:
a digital video mapper coupled to said target detector and position estimator for identifying and suppressing point source stationary target returns.

7. The system of claim 1 further including:
a radar receiving system responsive to reflected signal returns for developing normal and MTI video for each of the plurality of range bin intervals in each range sweep;
normal and MTI video quantizers, coupled to said radar receiving system, being responsive to the normal and MTI video for respectively developing the multibit quantized normal and MTI video, each of said quantizers having a plurality of circuits,
a test generator coupled to said normal and MTI video quantizers for developing a test video pulse at a preselected azimuth and range position and a pulse to enable said plurality of circuits in each of said quantizers to be tested; and
comparison means coupled between said normal and MTI video quantizers for performing automatic fault detection and isolation of said plurality of circuits in each of said quantizers.

8. The system of claim 1 wherein said first means includes:
tapped memory means responsive to the sequence of quantized MTI video in the plurality of range bin intervals for providing a plurality of differently delayed MTI outputs;
a plurality of first count circuit means, selectively coupled to said tapped memory means, being responsive to the plurality of differently delayed MTI outputs therefrom for developing a plurality of average values of clutter levels; and
a comparator circuit coupled to said plurality of first count circuit means for selecting the highest average value of clutter level from the plurality of average values of clutter levels during each range bin interval.

9. The system of claim 8 wherein said circuit means includes:
seventh means coupled between said comparator circuit and said fifth means for changing the threshold sensitivity of the highest average value of clutter level from said comparator circuit as a function of the number of targets being detected; and
eighth means coupled between said tapped memory means and said seventh means for rejecting clutter in the quantized MTI video contained in a predetermined one of said plurality of differently delayed MTI outputs during each range bin interval, said eighth means having an output circuit coupled to said third means for providing to said third means the output threshold-controlled quantized MTI video.

10. The system of claim 9 wherein:
said seventh means includes a plurality of multiplier circuits selectively enabled by the second control signal from said fifth means as a function of the number of targets being detected by said fourth means to multiply the highest average value of clutter level from said comparator circuit by one of a plurality of preselected multiplier values; and
fifth gating means coupled between said plurality of multiplier circuits and said eighth means for passing the multiplied highest average value of clutter level to said eighth means; and
said eighth means is a subtractor for subtracting the multiplied highest average value of clutter level from said fifth gating means from the quantized MTI video contained in the predetermined one of said plurality of differently delayed MTI outputs of said tapped memory means for providing to said third means of the output threshold controlled quantized MTI video.

11. The system of claim 9 wherein:
said plurality of tapped memory means comprise a serially-coupled multibit shift register circuits for storing the sequence of multibit quantized MTI video in order to provide the plurality of differently delayed MTI outputs.

12. The system of claim 9 wherein said fifth means includes:
target memory means coupled to said fourth means for storing target information;
second count circuit means coupled to said target memory means for counting the number of targets being stored in said target memory means; and
fourth gating means coupled between said second count circuit means and said seventh means for generating the second control signal to control the threshold sensitivity of said circuit means as a function of the number of targets being stored in said target memory means.

13. The system of claim 9 wherein said third means includes:
   delay means responsive to the quantized normal video for providing a delayed quantized normal video;
   first gating means coupled to said fourth means for passing video thereto to be detected;
   second gating means coupled to said second means and said first gating means and adapted to receive the threshold-controlled quantized MTI video from said output circuit of said eighth means; and
   third gating means coupled to said second means and said first gating means and adapted to receive the quantized normal video from said delay means, said second gating means being enabled to pass the threshold-controlled quantized MTI video to said first gating means when the first control signal is in the first state, said third gating means being enabled to pass the quantized normal video to said first gating means when the first control signal is in the second state.

14. The system of claim 13 wherein said fifth means includes:
   target memory means coupled to said fourth means for storing target information;
   second count circuit means coupled to said target memory means for counting the number of targets being stored in said target memory means; and
   fourth gating means coupled between said second count circuit means and said seventh means for generating the second control signal to control the threshold sensitivity of said circuit means as a function of the number of targets being stored in said target memory means.

15. The system of claim 14 wherein:
   said seventh means includes a plurality of multiplier circuits selectively enabled by the second control signal from said fourth gating means as a function of the number of targets being stored in said target memory means to multiply the highest average value of clutter level from said comparator circuit by one of a plurality of preselected multiplier values, and fifth gating means coupled between said plurality of multiplier circuits and said eighth means for passing the multiplied highest average value of clutter level to said eighth means; and
   said eighth means is a subtractor for subtracting the multiplied highest average value of clutter level from said fifth gating means from the quantized MTI video contained in the predetermined one of said plurality of differently delayed MTI outputs of said tapped memory means for providing to said third means the output threshold-controlled quantized MTI video.

16. The system of claim 14 wherein said fifth means further includes:
   sixth means coupled to said target memory means for converting the target information being stored in said target memory into a preselected format for subsequent use.

17. The system of claim 16 wherein said fourth means includes:
   a target detector and position estimator unit, coupled between said first gating means and said target memory means, responsive to the quantized video from said first gating means for generating the target information utilized by said fifth means.

18. The system of claim 17 wherein said fourth means further includes:
   a digital video mapper coupled to said target detector and position estimator for identifying and suppressing point source stationary target returns.

19. The system of claim 18 wherein:
   said seventh means includes a plurality of multiplier circuits selectively enabled by the second control signal from said fourth gating means as a function of the number of targets being stored in said target memory means to multiply the highest average value of clutter level from said comparator circuit by one of a plurality of preselected multiplier values, and fifth gating means coupled between said plurality of multiplier circuits and said eighth means for passing the multiplied highest average value of clutter level to said eighth means; and
   said eighth means is a subtractor for subtracting the multiplied highest average value of clutter level from said fifth gating means from the quantized MTI video contained in the predetermined one of said plurality of differently delayed MTI outputs of said tapped memory means for providing to said third means the output threshold-controlled quantized MTI video.

20. The system of claim 19 wherein:
   said tapped memory means comprise a plurality of serially-coupled multibit shift register circuits for storing the sequence of multibit quantized MTI video in order to provide the plurality of differently delayed MTI outputs.

21. The system of claim 7 further including:
   a normal video mixer, coupled between said radar receiving system and said normal video quantizer, being responsive to the normal and test video signals for providing normal video to said normal video quantizer during a live time portion of each range sweep and test video to said normal video quantizer during a first preselected portion of each range sweep; and
   an MTI video mixer coupled between said radar receiving system and said MTI video quantizer, being responsive to the MTI and test video signals for providing MTI video to said MTI video quantizer during the live time portion of each range sweep and test video to to said MTI video quantizer during the first preselected portion of each range sweep.

* * * * *